United States Patent
Wasserfallen et al.

(10) Patent No.: US 9,556,523 B2
(45) Date of Patent: Jan. 31, 2017

(54) METHOD FOR COATING METALLIC SURFACES OF SUBSTRATES, AND OBJECTS COATED ACCORDING TO SAID METHOD

(71) Applicant: Chemetall GmbH, Frankfurt am Main (DE)

(72) Inventors: Daniel Wasserfallen, Mainz (DE); Michael Schwamb, Frankfurt (DE); Aliaksandr Frenkel, Frankfurt (DE); Vera Sotke, Frankfurt am Main (DE); Wolfgang Bremser, Paderborn (DE); Martin Droll, Schlangen (DE); Oliver Seewald, Marsberg (DE); Ron Eilinghoff, Frankfurt (DE); Stephanie Gerold, Paderborn (DE); Evgenija Niesen, Soest (DE); Lars Schachtsiek, Paderborn (DE); Manuel Traut, Hamm (DE)

(73) Assignee: Chemetall GmbH (DE)

( * ) Notice: Subject to any disclaimer, the term of this patent is extended or adjusted under 35 U.S.C. 154(b) by 65 days.

(21) Appl. No.: 14/377,048

(22) PCT Filed: Feb. 7, 2013

(86) PCT No.: PCT/EP2013/052363
§ 371 (c)(1),
(2) Date: Aug. 6, 2014

(87) PCT Pub. No.: WO2013/117611
PCT Pub. Date: Aug. 15, 2013

(65) Prior Publication Data
US 2015/0079277 A1 Mar. 19, 2015

(30) Foreign Application Priority Data

Feb. 7, 2012 (DE) .................. 10 2012 201 804
Nov. 26, 2012 (DE) .................. 10 2012 221 521

(51) Int. Cl.
| | | |
|---|---|---|
| C23C 18/16 | (2006.01) |
| B05D 7/16 | (2006.01) |
| C09D 5/08 | (2006.01) |
| C09D 133/14 | (2006.01) |
| C23C 18/18 | (2006.01) |
| B05D 7/14 | (2006.01) |
| B05D 1/18 | (2006.01) |

(52) U.S. Cl.
CPC ........... *C23C 18/1637* (2013.01); *B05D 7/142* (2013.01); *B05D 7/16* (2013.01); *C09D 5/088* (2013.01); *C09D 133/14* (2013.01); *C23C 18/1692* (2013.01); *C23C 18/1803* (2013.01); *B05D 1/18* (2013.01); *B05D 7/14* (2013.01)

(58) Field of Classification Search
None
See application file for complete search history.

(56) References Cited

U.S. PATENT DOCUMENTS

| | | | |
|---|---|---|---|
| 3,089,783 A * | 5/1963 | Carlson | C09D 171/02 427/375 |
| 2010/0062200 A1 | 3/2010 | Domes et al. | |
| 2011/0212326 A1 | 9/2011 | Ettrich et al. | |
| 2013/0344310 A1 | 12/2013 | Wasserfallen et al. | |
| 2014/0004266 A1 | 1/2014 | Wasserfallen et al. | |
| 2015/0322288 A1* | 11/2015 | Wasserfallen | C09D 5/082 427/386 |

FOREIGN PATENT DOCUMENTS

| | | |
|---|---|---|
| DE | 10 2007 011 553 A1 | 9/2008 |
| DE | 10 2008 043 682 A1 | 5/2010 |
| DE | 10 2011 053 509 A1 | 3/2012 |

OTHER PUBLICATIONS

Shi et al, Prog. Polym. Sci. 29, pp. 987-1019, 2004.*
Thiele et al.; "On Ionotropic Gels Having Capillary Structure" From the University of Kiel, Department of Colloid Chemistry; Z.Naturforschig 13 b. 580-588; (1958); received on May 22, 1958; (English Translation thereof is also attached, 25 pages).

* cited by examiner

Primary Examiner — Erma Cameron
(74) Attorney, Agent, or Firm — Jeremy J. Kliebert

(57) ABSTRACT

A method and composition for coating surfaces, a corresponding coating and the use of objects coated according to said method. A cleaned, metallic surface is contacted with an aqueous composition that is a dispersion or suspension, and drying and/or baking the organic coating or optionally, drying the organic coating and coating with an equivalent or additional coating composition prior to a drying and/or baking. The aqueous composition has a pH of 4 to 11 and contains an anionic polyelectrolyte in a quantity of 0.01 to 5.0 wt. % relative to the total mass of the composition, which may have a solids content of from 2 to 40 wt. %. The solids have an average particle size from 10 to 1000 nm. A coating forms on the basis of an ionogenic gel which binds cations released from the metallic surface that originate from a pretreatment stage or from the contacting.

22 Claims, No Drawings

METHOD FOR COATING METALLIC SURFACES OF SUBSTRATES, AND OBJECTS COATED ACCORDING TO SAID METHOD

This application is a §371 of International Application No. PCT/EP2013/052363 filed Feb. 7, 2013, and claims priority from German Patent Application Nos. 10 2012 201 804.2 filed Feb. 7, 2012 and 10 2012 221 521.2 filed Nov. 26, 2012.

The invention relates to a method for coating surfaces, a corresponding coating and use of the objects coated by this method. There are numerous methods for creating homogeneous coatings on metallic surfaces in particular by means of dip coating methods. The following techniques are preferably used here for creating anticorrosion coatings in particular, consisting primarily of an organic matrix and/or organic and/or inorganic additive components.

The traditional methods are based on utilization of the rheological properties of the formulations that are used, in order to achieve a complete coating of a joined workpiece.

Although, after the dipping process, an accumulation of coating material in critical locations can be reduced by continuous rotation of the respective workpiece, it is impossible to achieve a completely homogeneous coating with this method. In addition, defects such as bubbling and pitting, which have a negative effect on the quality of the coating as a whole, may occur at locations where there are larger amounts of coating material during the drying and/or wetting operations.

Electrophoretic processes avoid these problems by using electricity to deposit a uniform coating by dipping. It is possible with this method to create homogeneous coatings on metallic workpieces. The deposited coatings have an extremely good adhesion in the wet state to the metallic substrate, which allows the workpiece to be processed in a downstream rinsing step without resulting in any separation of the coating. As a result, the aforementioned locations on a workpiece that are difficult to access can be freed of any remaining coating solution and therefore no defects can be formed during the drying process. This technique has the disadvantage that, in addition to the amount of electricity required and in addition to the need for suitable dip tanks, which cause a further increase in costs, so-called running at the edges also occurs because electric fields are built up heterogeneously at macroscopic edges and the edges are coated irregularly and possibly even incompletely. Furthermore, cavities must be avoided in the design of the workpieces because an effect comparable to the Faraday cage phenomenon occurs at these locations. Because of the reduction in the electric field strength required for decomposition, the coating applied to the workpiece in such regions may be greatly reduced or nonexistent due to this method (wrap-around problems), which in turn results in negative effects on the quality of the coating. In addition, this technique has the following disadvantages in electrodip coating (EDC), such as cathodic dip coating (CDC): a corresponding dip bath is very expensive to create together with all the electrical and mechanical equipment, from temperature regulation, power supply and electric insulation, circulation equipment and dosing equipment, to disposal of the anolyte acid formed in the electrolytic coating process, including ultra-filtration for recycling of the coating as well as the control equipment. The process management also involves a very high technical complexity because of the high amperage and high electricity consumption as well as equalizing the electrical parameters based on the bath volume and with precise adjustment of all process parameters as well as the maintenance and cleaning of the installation.

The known autophoretic processes are based on a currentless concept consisting of a pickling attack on the substrate surface, in which metal ions are dissolved out of the surface and an emulsion coagulates on the resulting interface because of the concentration of metallic ions. Although these processes do not have the restrictions mentioned above for electrolytic processes with respect to the Faraday cage effect, the coating formed in this process must be secured in a complex multistage dipping process after the first activation step. In addition, the pickling attack results in unavoidable contamination of the active zone with metal ions that must be removed from the zones. Furthermore, this method is based on a chemical deposition process that is not self-regulating and cannot be terminated as needed, such as by turning off the electric current in the electrolytic processes, for example. It is therefore unavoidable that an excessive layer thickness will develop with a longer dwell time of the metallic substrates in the active zones.

One goal that has been pursued for a long time is to efficiently and inexpensively produce homogeneous coatings in an immersion process in order to produce thicker coatings that are essentially smooth and as closed as possible.

The object of the present invention is therefore to propose a method by which a paint formulation can be deposited easily and homogeneously on metallic surfaces with good coverage using a liquid system, which is also rinse-resistant, if necessary. Therefore, the object was also to propose the simplest possible method for accomplishing this.

This object is achieved with a method for coating metallic surfaces of substrates, comprising or consisting of the steps:
I. supplying a substrate having a cleaned metallic surface,
II. contacting and coating metallic surfaces with an aqueous composition in the form of a dispersion and/or suspension,
III. optionally rinsing the organic coating and
IV. drying and/or baking the organic coating or
V. optionally drying the organic coating and also coating with a similar or additional coating composition before drying and/or baking, such that in step II, the coating is performed using an aqueous composition in the form of a dispersion and/or suspension, wherein at least one anionic polyelectrolyte is added in an amount of 0.01 to 5.0 wt %, based on the total mass of the resulting mixture, to a dispersion of film-forming polymers and/or a suspension of film-forming inorganic particles with a solids content of 2 to 40 wt % and an average particle size of 10 to 1000 nm, such that the aqueous composition has a pH value in the range of 4 to 11 and forms a coating based on an ionogenic gel, which binds cations dissolved out of the metallic surface, so that these cations originate from a pretreatment stage and/or from contacting in step II.

The coating according to the invention has a single-layer structure, such that either a more or less homogeneous coating or a coating in which the particles are present to a somewhat greater extent near the metallic surface is formed and/or may be obtained.

According to the invention, substrates with a metallic surface that can be coated in this way include metals, surfaces with a metallic coating or metal surfaces that have been pretreated with primers but from which metal cations can still be dissolved. In particular the term "surface(s) to be coated" in the sense of the present patent application also includes surfaces of metallic objects and/or metallic particles which may optionally be precoated, for example, with a metallic coating such as a coating based on zinc or a zinc alloy and/or at least one coating comprised of a pretreatment composition or a treatment composition such as one based on chromate, $Cr^{3+}$, a Ti compound, a Zr compound, a silane/silanol/siloxane/polysiloxane and/or an organic polymer.

Basically, the metallic materials may include all types of metallic materials, in particular those made of aluminum, iron, copper, titanium, zinc, tin and/or alloys containing aluminum, iron, steel, copper, magnesium, nickel, titanium, zinc and/or tin, which may also be used side-by-side and/or in succession. The surfaces of these materials may optionally also be precoated with zinc or an alloy containing aluminum and/or zinc, for example.

The objects to be coated may basically include all types of objects that are made of a metallic material or those that are provided with at least one metallic coating. Especially preferred objects include in particular strips (coils), sheets and plates, parts, such as small parts, for example, joined components, components with a complex shape, profiles, rods and/or wires.

The terms "currentless coating" in the sense of the present patent application means that, in contrast with the known electrolytic methods for producing the subsequent coating, an electrical voltage of less than 100V is applied from the outside when producing a coating with a composition containing the solution and/or dispersion (=suspension and/or emulsion).

The invention preferably relates to a method in which the anionic polyelectrolyte contains or consists of a) at least one polysaccharide based on glycogens, amyloses, amylopectins, calloses, agar, algines, alginates, pectins, carrageenan, celluloses, chitins, chitosans, curdlans, dextrans, fructanes, collagens, gellan gum, gum arabic, starches, xanthans, gum tragacanth, carayans, carabean powder and glucomannans; b) at least one anionic polyelectrolyte of natural origin based on polyamino acids, collagens, polypeptides, lignins and/or c) at least one synthetic anionic polyelectrolyte based on polyamino acids, polyacrylic acids, polyacrylic acid copolymers, acrylamide copolymers, lignins, polyvinyl sulfonic acid, polycarboxylic acids, polyphosphoric acids or polystyrenes.

The method according to the invention is preferably one in which the aqueous composition and/or the organic coating produced therefrom contains at least one species of cations selected from those based on cationic reactive salts, selected from the group consisting of melamine salts, nitroso salts, oxonium salts, ammonium salts, salts with quaternary nitrogen cations, salts of ammonium derivatives and metal salts of Al, B, Ba, Ca, Cr, Co, Cu, Fe, Hf, In, K, Li, Mg, Mn, Mo, Na, Nb, Ni, Pb, Sn, Ta, Ti, V, W, Zn and/or Zr.

The term "copolymer" in the sense of this patent application describes polymers comprised of two or more different types of monomer units. Copolymers here can be divided into five classes, as will now be illustrated on the basis of a binary copolymer composed of two different comonomers A and B:

1. Random copolymers in which the distribution of the two monomers in the chain is random (AABABBBA-BAABBBABBABAB . . . );
2. Two gradient copolymers, which are in principle similar to the random copolymers but contain variable amounts of a monomer in the course of the chain (AAAAAABAAB-BAABABBBAABBBBBB);
3. Alternating copolymers with a regular arrangement of the monomers along the chain (ABABABABABABABA-BABAB . . . );
4. Block copolymers consisting of longer sequences or blocks of each monomer (AAAAAAAAABBBBBBBBBBBBB . . . ) in which, depending on the number of blocks, we also speak of diblock, triblock and multiblock copolymers;
5. Graft copolymers in which blocks of a monomer are grafted onto the backbone of another monomer.

The term "derivative" in the sense of this patent application denotes a derived substance of a structure similar to that of a corresponding basic substance. Derivatives are substances whose molecules have a different atom or a different atomic group instead of one hydrogen atom or one functional group and/or in which one or more atoms/atomic groups have been removed.

The term "polymer(s)" in the sense of this patent application denotes monomer(s), oligomer(s), polymer(s), copolymer(s), block copolymer(s), graft copolymer(s), mixtures thereof and compounding thereof on an organic basis and/or essentially organic basis. The "polymer(s)" in the sense of the present patent application is/are primarily or entirely polymer(s) and/or copolymer(s).

The method according to the invention is especially preferably a method in which the aqueous composition and/or the organic coating produced from it has/have an organic particle content based on polyacrylates, polyurethane, polyepoxies and/or the hybrids thereof.

So-called hybrid polyacrylate-polyurethane resins can be differentiated according to type as hybrid systems produced by simply mixing the different dispersions (blends or formulations); those having a chemical bond between the different types of polymers and those in which the different polymer classes form interpenetrating networks (IPN).

Such hybrid polyurethane-polyacrylate dispersions are usually prepared by emulsion polymerization of a vinyl polymer ("polyacrylate") in an aqueous polyurethane dispersion. However, it is also possible to prepare the hybrid polyurethane-polyacrylate dispersion as a secondary dispersion.

Aqueous hybrid polyacrylate-polyepoxy dispersions are usually prepared by addition reactions of a bifunctional epoxy with bifunctional amine monomer building blocks and then reacting them with a polyacrylate having enough carboxyl functions. As is the case with secondary polyurethane dispersions, for example, water dispersibility can be achieved by means of carboxylate groups, which have been converted to anionic groups with amines, and then by dispersing them in water.

Hybrid dispersions to form a layer on a substrate may preferably also contain organic polymers and/or copolymers based on polyvinyl alcohols, polyvinyl acetates, polybutyl acrylates and/or other acrylic acid esters in addition to polyurethane and polyepoxy components. Acrylic acid esters are esters derived from acrylic acid ($CH_2$=CH—COOH) and therefore have the functional group ($CH_2$=CH—COOR). Acrylic acid methyl ester, acrylic acid ethyl ester, acrylic acid butyl ester and ethyl hexyl acrylate, among others, are produced in large quantities. The main application for acrylic acid esters is in homopolymers and copolymers, for example, acrylic acid, acrylamides, methacrylates, acrylonitrile, fumaric acids, itaconic acid, maleates, vinyl acetate, vinyl chloride, styrene, butadiene and unsaturated polyesters, polyepoxy esters, polyacrylamides, polyacrylic acids, polycarbonates, polyesters, polyethers, polystyrene butadienes, poly(meth)acrylic acid esters, polyvinyl acetate copolymers with acrylic acid esters and/or copolymers with dibutyl maleate and/or with vinyl esters of at least one cooking acid, polyethylenes, polyvinyl chlorides, polyacrylonitriles, polyepoxies, polyurethanes, polyacrylates, polymethacrylates, polyesters, polyamides, polytetrafluoroethylenes, polyisobutadienes, polyisoprenes, silicones, silicone rubbers and/or their derivatives. These are present in amounts of at least 50 wt % of the solids and active ingredients in the aqueous composition.

The term "pretreatment" refers to a treatment (=contacting of the surfaces to be coated with a composition which is usually liquid), in which another coating is applied to protect the layer sequence and the object, such as at least one enamel, for example, optionally after a subsequent coating.

In a previous pretreatment before activation of a surface with an activating agent that should help to create and electrostatic charge on the surface, the surfaces to be treated are first cleaned with an alkali as needed and optionally contacted with a composition for pretreatment, the latter in particular for a conversion layer. Then the surfaces treated and/or coated in this way may optionally be coated and/or optionally oiled with a primer and/or with a protective layer, optionally one that can be shaped, in particular with an anticorrosion primer. The oiling then serves in particular to provide temporary protection for the treated and/or coated in particular metallic surfaces.

Basically any type of pretreatment is possible: for example, aqueous pretreatment compositions based on phosphate, phosphonate, silane/silanol/polysiloxane, lanthanide compound, titanium compound, hafnium compound, zirconium compounds, acid, metal salt and/or organic polymer may be used.

In the further treatment of these coated substrates, a cleaning may be performed, in particular with an alkali as needed, regardless of whether or not oil has already been applied.

A coating with an anticorrosion primer such as a welding primer, for example, can provide additional corrosion protection, in particular in cavities and sections of a substrate that are not readily accessible, as well as formability and/or joinability, for example, in folding, gluing and/or welding. In industrial practice, an anticorrosion primer could be used in particular when the substrate coated with it such as, for example, sheet metal, can be shaped after being coated with the anticorrosion primer and/or can be joined to another component and when additional coatings are applied only thereafter. If an anticorrosion primer is also applied beneath the activation layer and beneath the particle coating in this sequence of operations, a definitely improved protection against corrosion is usually achieved.

The term "essentially rinse fast" in the sense of this patent application means that under the conditions of the respective instillation and process sequence, the last coating is not removed entirely by a rinsing operation (=rinsing), so that a coating can be produced, preferably a closed coating.

A wide variety of types of particles, particle sizes and particle shapes may be used with the method according to the invention.

Particles that may be used in the aqueous composition to form the layer preferably include oxides, hydroxides, carbonates, phosphates, phosphosilicates, silicates, sulfates, organic polymers including copolymers and derivatives thereof, waxes and/or compounded particles in particular those based on anticorrosion pigments, organic polymers, waxes and/or compounded particles and/or mixtures thereof. They preferably have particle sizes in the range from 5 nm to 15 µm, from 8 nm to 5 µm, from 12 nm to 3 µm or from 15 nm to 1.5 µm, in particular from 20 nm to 1 µm, from 30 nm to 700 nm, from 40 nm to 600 nm or from 50 nm to 500 nm. They are preferably water-insoluble particles.

Compounded particles have a mixture of at least two different substances in one particle. Compounded particles may often contain other substances with very different properties. For example, they may contain entirely or in part the composition for a paint, optionally even containing substances that do not have a particulate form such as surfactants, foam suppressants, dispersant, paint additives, additional types of additives, pigments, corrosion inhibitors, sparingly water-soluble anticorrosion pigments and/or other substances that are customary and/or known for the corresponding mixtures. Such paint ingredients may be suitable for organic coatings, for shaping, for anticorrosion primers and other primers, for colored paints, fillers and/or clear varnishes, for example.

An anticorrosion primer usually contains electrically conductive particles and can be welded electrically. In is often preferable here in general that a) a mixture of chemically and/or physically different particles, b) particles, aggregates and/or agglomerates of chemically and/or physically different particles and/or c) compounded particles is/are used in the composition and/or in the particle layer formed using the composition.

It is often preferable for the composition that contains particles and/or the particle layer formed from this composition to also contain at least one nonparticulate substance in addition to at least one type of particles, namely in particular additives, pigments, corrosion inhibitors and/or weakly water-soluble anticorrosion pigments. The particles present in the composition and/or in the particle layer formed from the composition may in particular consist of colored particles and/or optionally also a limited amount of electrically conductive particles, in particular those based on fullerenes and other carbon compounds having structures resembling graphite and/or carbon black, optionally also nanocontainers and/or nanotubes. On the other hand, the particles in the composition and/or in the coating produced from the composition may consist of coated particles, chemically and/or physically modified particles, core-shell particles, compounded particles from a variety of substances, encapsulated particles and/or nanocontainers in particular.

It is preferable in the method according to the invention for the composition that contains the particles, the particle layer formed from the composition and/or the coating formed from the composition, for example, by producing a film and/or crosslinking to also contain, in addition to at least one coloring agent, one pigment, an anticorrosion pigment, a corrosion inhibitor, a conductivity pigment, another type of particles, a silane/silanol/siloxane/polysiloxane/silazane/polysilazane, a paint additive and/or an additive, such as at least one surfactant, one foam suppressant and/or one dispersant. In the method according to the invention, it is preferable for the composition and/or the coating formed from the composition to also contain, partially or completely, a chemical composition for a primer, a paint such as, for example, a filler, a top coat and/or a clear coat, in addition to at least one type of particle and optionally in addition to at least one non-particulate substance.

In many embodiments, pigments and/or additives such as those often used in paints and/or primers are recommended as additives to the organic polymers.

Formation of a film can be improved by the use of thermoplastic polymers and/or by adding substances that serve as temporary plasticizers. Film-forming aids act as specific solvents, which soften the surface of the polymer particles and thus make it possible to fuse them. It is advantageous here if these plasticizers remain in the aqueous composition for a long enough time to be able to act on the polymer particles, on the one hand, and then to evaporate and thus escape from the film. Furthermore, it is advantageous if a residual water content is also present for a sufficiently long period of time during the drying process.

So-called long-chain alcohols, in particular those with 4 to 20 carbon atoms, are especially advantageous as film-forming aids, such as
a butenediol,
a butyl glycol,
a butyl diglycol,
an ethylene glycol ether, such as ethylene glycol monobutyl ether,
ethylene glycol monoethyl ether,
ethylene glycol monomethyl ether,
ethylene glycol propyl ether,
ethylene glycol hexyl ether,
diethylene glycol methyl ether,
diethylene glycol ethyl ether,
diethylene glycol butyl ether,
diethylene glycol hexyl ether or a
polypropylene glycol ether, such as
propylene glycol monomethyl ether,
dipropylene glycol monomethyl ether,
tripropylene glycol monomethyl ether,
propylene glycol monobutyl ether,
dipropylene glycol monobutyl ether,
tripropylene glycol monobutyl ether,
propylene glycol monopropyl ether,
dipropylene glycol monopropyl ether,
tripropylene glycol monopropyl ether,
propylene glycol phenyl ether,
trimethylpentanediol diisobutyrate,
a polytetrahydrofuran,
a polyether polyol and/or a polyester polyol.

Crosslinking may be induced with certain reactive groups, such as, for example, isocyanate groups, isocyanurate groups and/or melamine groups.

The subsequent coating is preferably dried in such a way that any organic polymer particles that are present in particular are able to form a film so that a largely or completely homogeneous coating is formed. The drying temperatures in many embodiments may be selected to be high enough that the organic polymer constituents are able to crosslink.

With the method according to the invention, it is preferable in some specific embodiments for a particle layer containing essentially organic particles to be formed and to be crosslinked and/or to form a film in drying, for example. In many specific embodiments, the film is formed even without the presence of film-forming aids. The particles in the coating here, in particular when they are primarily or entirely present as organic polymers, may preferably form an essentially closed film or a closed coating, in particular in drying. It is often preferable for the drying temperature of a coating, which consists primarily or entirely of organic polymers, to be selected, so that a closed or essentially closed coating is formed. If necessary, at least one film-forming aid may be added to form the film, in particular an aid based on at least one long-chain alcohol. In specific embodiments with multiple particle layers disposed one above the other, preferably all the particle layers are applied first and then they are crosslinked jointly and/or a film is formed.

The at least one film-forming aid content in the aqueous composition—in particular in a bath—may preferably amount to 0.01 to 50 g/L, based on the solids, including the active ingredients, especially 0.08 to 35 g/L, most especially preferably 0.2 to 25 g/L, 0.3 to 20 g/L or 0.5 to 16 g/L, in particular 1 to 12 g/L, 2 to 10 g/L, 3 to 8 g/L or 4 to 6 g/L. The weight ratio of the organic film-forming agent content to the film-forming additive content in the aqueous composition—in particular in the bath—may vary in a wide range. It may in particular be ≤(100:0.1). This ratio is preferably in the range of 100:10 to 100:0.2, from 100:5 to 100:0.4 or from 100:2.5 to 100:0.6, especially preferably in the range from 100:2 to 100:0.75, from 100:1.6 to 100:0.9 or from 100:1.4 to 100:1.

It is often preferable for the drying, film forming and/or crosslinking to take place in the temperature range from 5 to 350° C., from 8 to 200° C., from 10 to 150° C., from 12 to 120° C. or from 14 to 95° C., especially preferably in the temperature range from 16 to 40° C., based on the oven temperature and/or based on the peak metal temperature (PMT). The selected temperature range largely depends on the type and amount of the organic constituents and optionally also the inorganic constituents and optionally also their film-forming temperatures and/or crosslinking temperatures.

The invention preferably relates to a method in which the aqueous composition and/or the organic coating produced from it contains at least one complexing agent for metal cations or a polymer that is modified by complexing metal cations.

The method according to the invention is preferably one in which the aqueous composition and/or the organic coating produced from it contains at least one complexing agent selected from those based on maleic acid, alendronic acid, itaconic acid, citriconic acid or mesaconic acid or the anhydrides or hemiesters of these carboxylic acids.

The aqueous composition and/or the organic coating produced from it advantageously contain(s) at least one emulsifier.

It is especially preferable for the aqueous composition and/or the organic coating produced from it to contain at least one emulsifier selected from those based on anionic emulsifiers.

The aqueous composition and/or the organic coating produced from it preferably contain(s) a mixture of at least two different anionic polyelectrolytes.

The aqueous composition and/or the organic coating produced from it especially preferably contain(s) a mixture of two pectins.

Also preferably the aqueous composition and/or the organic coating produced from the composition contain(s) at least one anionic polysaccharide selected from those with a degree of esterification of the carboxyl function in the range of 5 to 75%, based on the total number of alcohol and carboxyl groups.

Most especially preferably the aqueous composition and/or the organic coating produced from the composition contains at least one anionic polysaccharide and/or at least one anionic polyelectrolyte selected from those having a molecular weight in the range of 500 to 1,000,000 g/mol$^{-1}$.

The aqueous composition and/or the organic coating produced from the composition preferably contains at least one anionic polysaccharide and/or at least one anionic polyelectrolyte selected from those with a degree of amidation of the carboxyl functions in the range of 1 to 50%, a degree of epoxidation of the carboxyl functions of up to 80%.

In the method according to the invention it is especially preferable for the anionic polyelectrolytes to be modified with adhesion mediating groups selected from the group consisting of chemical groups of multifunctional epoxies, isocyanates, primary amines, secondary amines, tertiary amines, quaternary amines, amides, imides, imidazoles, formamides, Michael reaction products, carbodiimides, carbenes, cyclic carbenes, cyclocarbonates, multifunctional carboxylic acids, amino acids, nucleic acids, methacrylamides, polyacrylic acids, polyacrylic acid derivatives, polyvinyl alcohols, polyphenols, polyols with at least one alkyl and/or aryl group, caprolactam, phosphoric acids, phosphoric acid esters, epoxy esters, sulfonic acids, sulfonic acid esters, vinyl sulfonic acids, vinyl phosphonic acids, catechol, silanes as well as the silanols and/or siloxanes formed therefrom as well as triazines, thiazoles, thiazines, dithiazines, acetals, hemiacetals, quinones, saturated fatty acids, unsaturated fatty acids, alkyds, esters, polyesters, ethers, glycols, cyclic ethers, crown ethers, anhydrides as well as acetyl acetones and β-diketo groups, carbonyl groups and hydroxyl groups.

Al, Cu, Fe and/or Zn is/are advantageously selected as the cations that are dissolved out of the metallic surface and/or are added to the aqueous composition.

The aqueous composition and/or the organic coating prepared from it especially preferably contain(s) at least one additive selected from additives consisting of the group of biocides, dispersant aids, film-forming aids, acidic and/or basic aids for adjusting the pH value as well as thickeners and flow control agents.

Most especially preferably the metallic surfaces are cleaned, pickled and/or pretreated before contacting and coating the metallic surfaces with an aqueous composition in process step II.

The aqueous composition advantageously forms a coating based on an ionogenic gel in which the dry film which is formed there or later has a thickness of at least 1 μm.

The organic coating is especially preferably formed in 0.05 to 20 minutes in the immersion bath and has a dry film thickness in the range of 5 to 100 μm after being dried.

The invention also relates to an aqueous composition containing at least one anionic polyelectrolyte in an amount of 0.01 to 5.0 wt %, based on the total mass of the resulting mixture, in a dispersion of film-forming polymers and/or a suspension of film-forming inorganic particles with a solids content of 2 to 40 wt % and an average particle size of 10 to 1000 nm, wherein the aqueous composition has a pH value in the range of 4 to 11.

The aqueous composition is preferably an aqueous composition containing, in the dispersion of film-forming polymers, an amount of organic particles based on polyacrylates, polyurethanes, polyepoxies and/or their hybrids, an amount of at least one complexing agent selected from those based on maleic acid, alendronic acid, itaconic acid, citraconic acid or mesaconic acid or anhydrides or hemiesters of these carboxylic acids and at least one anionic polyelectrolyte based on pectins or gellan gum.

It has been found that of the surfaces coated according to the invention, the coatings that are essentially closed and have a layer thickness in the range of 5 nm to 50 μm can be prepared from the surfaces coated according to the invention, in particular a layer thickness in the range of 15 nm to 40 μm, 25 nm to 30 μm, 45 nm to 20 μm, 60 nm to 15 μm, 80 nm to 10 μm, 100 nm to 8 μm, 130 nm to 6 μm, 160 nm to 4 μm, 200 nm to 2 μm or 400 nm to 1 μm. The individual coatings may have the corresponding layer thicknesses before and/or after they form a film and/or before they are crosslinked.

It has been found that surfaces coated according to the invention, from which then essentially closed coatings have been produced, can be produced by a much simpler and much less expensive method than, for example, electrode coating, autophoretic dip coating or powder coating.

Furthermore, it has been found that the properties of such coatings produced according to the invention may be equivalent to those obtained by electrodip coating, autophoretic dip coating or powder coating according to today's industrial practice, if their formulations having a suitable chemical composition are used in particular.

It has surprisingly been found that the method according to the invention, which is not essentially an electrolytic method, can also be operated easily and without expensive controls even in the event that it is only slightly supported with electricity and therefore usually does not require that any external electric voltage be applied. This method can be used over a wide temperature range and even at room temperature if the subsequent drying step is omitted.

It has surprisingly been found that with the method according to the invention, no complex control measures are required with regard to applying the activating agent in order to achieve a uniform and homogeneous coating and that high quality protective subsequent coatings which achieve a thickness in the range of 500 nm to 30 μm are formed with a low consumption of chemicals.

It has surprisingly been found that with regard to the deposition of the subsequent coating in particular in the method according to the invention, this is a self-regulating process in which no complex control measures are required and high quality protective coatings are formed with a low consumption of chemicals.

It has surprisingly been found that the subsequent coatings deposited according to the invention form a homogeneous layer with a uniform dry layer thickness on a workpiece of a complex shape, such that the coatings are comparable to the quality of a paint layer deposited by a traditional electrophoretic or autophoretic process.

The coating according to the invention may preferably be used for coated substrates as wire, braided wire, strips, sheet metal, profiles, trim and paneling, parts of a vehicle or airplane, as elements for household appliances, elements in construction, frameworks, guide plank, heating body or fencing elements, molded parts of a complex geometry or small parts, for example, screws, nuts, flanges or springs. These parts are especially preferably used in automotive engineering, in construction, for equipment engineering, for household appliances or in heating installation. Use of the process according to the invention is especially preferred for coating substrates that have posed problems in coating with an electrodip enamel.

The present invention is described in greater detail below on the basis of 16 exemplary embodiments and two comparative examples. The following substrates are used in step I:
1. Electrolytically galvanized steel plate with a zinc layer thickness of 5 μm, sheet metal thickness 0.81 mm;
2. Cold rolled steel, sheet metal thickness approx. 0.8 mm;
3. Aluminum alloy of quality class AC 170, sheet metal thickness approx. 1.0 mm and the following general treatment steps were performed:
II. Alkaline Cleaning:
30 g/L Gardoclean® S 5176 and 4 g/L Gardobond® additive H 7406 from Chemetall GmbH prepared in tap water. The metal plates were cleaned for 180 sec by spraying at 60° C. and then were rinsed by dipping them for 120 sec in tap water and 120 sec in deionized water.

III. Coating the Surfaces with Dispersions According to the Invention to Form the Organic Coating:
Composition of the Dispersion

| DPE dispersion with maleic acid | |
|---|---|
| nfA$_{theoretical}$ = 40% | nfA$_{practical}$ = 39% |
| Chemicals | (g) |
| Step 1 | |
| H$_2$O | 770 |
| NH$_3$ (25%) | 6.24 |
| MS | 5.06 |
| DPE | 2.0531 |
| MMA | 25.05 |
| APS | 3.12 |
| H$_2$O | 67.6 |
| Step 2 | |
| BMA | 500 |
| HEMA | 25 |

LIST OF ABBREVIATIONS

NH$_3$: ammonia solution (25%)
AS: acrylic acid
DPE: diphenylethylene
MMA: methyl methacrylate
APS: ammonium peroxodisulfate
BMA: butyl methacrylate
HEMA: hydroxyethyl methacrylate
MS: maleic acid
VTES: vinyl triethoxysilane
nfA: nonvolatile fraction or solid content Only the above dispersion without addition of the polyelectrolytes considered for the use according to the invention was used for the two comparative examples. If necessary, the mixture was adjusted to a pH value of 4 with acid before use, preferably nitric acid and/or phosphoric acid.

IV. Rinsing the Organic Coating:

Rinsing after the organic coating serves to remove non-adhering components of the formulation and accumulations of the formulation and to make the procedure as close to actual conditions as possible in the automobile industry under the same conditions as those usually practiced in the automotive industry because rinsing with water in the automobile industry is usually performed either by a dip rinse or a spray rinse.

V. Drying and/or Crosslinking the Coating:

Drying or drying with formation of a film of the organic polymer components in particular: 175° C. for 15 minutes Parallel studies with eddy current measurement equipment and scanning electron microscopy (SEM) have illustrated that coatings were formed according to the invention, and then closed or mostly closed coatings could be obtained from them by contacting the surfaces with dispersions and/or formulations.

EXAMPLE 1

Substrate 1 was mixed with a mixture of the dispersion described above and 0.5% wt %, based on the total amount of the resulting mixture, with a pectin having a molecular weight of approx. 70,000 g/mol, a degree of amidation of 0%, a degree of esterification of 52%, a degree of epoxidation of 0%, a galacturonic acid content of 87%, being mixed with 99.5 wt % of the above dispersion. This mixture was adjusted to a pH value of 4 with acid, preferably nitric acid and/or phosphoric acid, prior to use, if necessary. A dry film thickness of 5 μm was measured with an eddy current measurement instrument and by SEM.

EXAMPLE 2

Test 1 was repeated with substrate 2 and a dry film thickness of 1 μm determined by SEM.

EXAMPLE 3

Substrate 1 was mixed with a mixture of the dispersion described above and 0.5% wt %, based on the total amount of the resulting mixture, a pectin with a molecular weight of approx. 70,000 g/mol, a degree of amidation of 0%, a degree of esterification of 38%, a degree of epoxidation of 0%, a galacturonic acid content of 85%, being mixed with 99.5 wt % of the above dispersion. Before use, if necessary, the mixture was adjusted with acid, preferably nitric acid and/or phosphoric acid, to a pH value of 4. A dry film thickness of 12 μm was measured using an eddy current measurement device and SEM.

EXAMPLE 4

Test 3 was repeated with substrate 2 and a dry film thickness of 3 μm determined by SEM.

EXAMPLE 5

Substrate 1 was mixed with a mixture of the dispersion described above and 0.5% wt %, based on the total amount of the resulting mixture, a pectin with a molecular weight of approx. 70,000 g/mol, a degree of amidation of 0%, a degree of esterification of 10%, a degree of epoxidation of 0%, a galacturonic acid content of 85%, being mixed with 99.5 wt % of the above dispersion. Before use, if necessary, the mixture was adjusted with acid, preferably nitric acid and/or phosphoric acid, to a pH value of 4. A dry film thickness of 10 μm was measured using an eddy current measurement device and SEM.

EXAMPLE 6

Test 5 was repeated with substrate 2 and a dry film thickness of 2 μm determined by SEM.

EXAMPLE 7

Substrate 1 was mixed with a mixture of the dispersion described above and 0.25% wt %, based on the total amount of the resulting mixture, a pectin with a molecular weight of approx. 70,000 g/mol, a degree of amidation of 11%, a degree of esterification of 41%, a degree of epoxidation of 0%, a galacturonic acid content of 88% with 99.5 wt % and 0.25% wt %, based on the total amount of the resulting mixture, a pectin with a molecular weight of approx. 70,000 g/mol, a degree of amidation of 0%, a degree of esterification of 52%, a degree of epoxidation of 0%, a galacturonic acid content of 87%, being mixed with 99.5 wt % of the above dispersion. Before use, if necessary, the mixture was adjusted with acid, preferably nitric acid and/or phosphoric acid, to a pH value of 4. A dry film thickness of 50 μm was measured using an eddy current measurement device and SEM.

EXAMPLE 8

Substrate 1 was mixed with a mixture of the dispersion described above and 0.25% wt %, based on the total amount of the resulting mixture, a pectin with a molecular weight of approx. 70,000 g/mol, a degree of amidation of 11%, a degree of esterification of 41%, a degree of epoxidation of 0%, a galacturonic acid content of 88% with 99.5 wt % and 0.25% wt %, based on the total amount of the resulting mixture, a pectin with a molecular weight of approx. 70,000 g/mol, a degree of amidation of 0%, a degree of esterification of 38%, a degree of epoxidation of 0%, a galacturonic acid content of 85%, being mixed with 99.5 wt % of the above dispersion. Before use, if necessary, the mixture was adjusted with acid, preferably nitric acid and/or phosphoric acid, to a pH value of 4. A dry film thickness of 23 μm was measured using an eddy current measurement device and SEM.

EXAMPLE 9

Substrate 1 was mixed with a mixture of the dispersion described above and 0.25% wt %, based on the total amount of the resulting mixture, a pectin with a molecular weight of approx. 70,000 g/mol, a degree of amidation of 23%, a degree of esterification of 29%, a degree of epoxidation of 0%, a galacturonic acid content of 89% with 99.5 wt % and 0.25% wt %, based on the total amount of the resulting mixture, a pectin with a molecular weight of approx. 70,000 g/mol, a degree of amidation of 0%, a degree of esterification of 72%, a degree of epoxidation of 0%, a galacturonic acid content of 83% with 99.5 wt %, being mixed with 99.5 wt % of the above dispersion. Before use, if necessary, the mixture was adjusted with acid, preferably nitric acid and/or phosphoric acid, to a pH value of 4. A dry film thickness of 22 μm was measured using an eddy current measurement device and SEM.

EXAMPLE 10

Substrate 1 was mixed with a mixture of the dispersion described above and 0.25% wt %, based on the total amount of the resulting mixture, a pectin with a molecular weight of approx. 70,000 g/mol, a degree of amidation of 23%, a degree of esterification of 20%, a degree of epoxidation of 0%, a galacturonic acid content of 89% with 99.5 wt % and 0.25% wt %, based on the total amount of the resulting mixture, a pectin with a molecular weight of approx. 70,000 g/mol, a degree of amidation of 0%, a degree of esterification of 10%, a degree of epoxidation of 0%, a galacturonic acid content of 85%, being mixed with 99.5 wt % of the above dispersion. Before use, if necessary, the mixture was adjusted with acid, preferably nitric acid and/or phosphoric acid, to a pH value of 4. A dry film thickness of 27 μm was measured using an eddy current measurement device and SEM.

EXAMPLE 11

Test 10 was repeated with substrate 2 and a dry film thickness of 2 μm determined by SEM.

EXAMPLE 12

Substrate 1 was mixed with a mixture of the dispersion described above and 0.25% wt %, based on the total amount of the resulting mixture, a pectin with a molecular weight of approx. 70,000 g/mol, a degree of amidation of 0%, a degree of esterification of 52%, a degree of epoxidation of 0%, a galacturonic acid content of 87% and 0.25% wt %, based on the total amount of the resulting mixture, a pectin with a molecular weight of approx. 70,000 g/mol, a degree of amidation of 0%, a degree of esterification of 10%, a degree of epoxidation of 0%, a galacturonic acid content of 85%, being mixed with 99.5 wt % of the above dispersion. If necessary, the mixture was adjusted with acid prior to use, preferably with nitric acid and/or phosphoric acid, to a pH value of 4. A dry film thickness of 40 μm was measured using an eddy current measurement device and SEM.

EXAMPLE 13

Test 12 was repeated with substrate 2 and a dry film thickness of 10 μm determined by SEM.

EXAMPLE 14

Substrate 1 was mixed with a mixture of the dispersion described above and 0.5% wt %, based on the total amount of the resulting mixture, a pectin with a molecular weight of approx. 70,000 g/mol, a degree of amidation of 0%, a degree of esterification of 38%, a degree of epoxidation of 0%, a galacturonic acid content of 85% and 0.25% wt %, based on the total amount of the resulting mixture, a pectin with a molecular weight of approx. 70,000 g/mol, a degree of amidation of 0%, a degree of esterification of 10%, a degree of epoxidation of 0%, a galacturonic acid content of 85%, being mixed with 99.5 wt % of the above dispersion. Before use, if necessary, the mixture was adjusted with acid, preferably nitric acid and/or phosphoric acid, to a pH value of 4. A dry film thickness of 30 μm was measured using an eddy current measurement device and SEM.

EXAMPLE 15

Test 14 was repeated with substrate 2 and a dry film thickness of 10 μm determined by SEM.

EXAMPLE 16

Substrate 3 was mixed with a mixture of the dispersion described above and 0.5% wt %, based on the total amount of the resulting mixture, a gellan gum with a molecular weight of approx. 70,000 g/mol, a low acyl content with 99.5 wt % of the above dispersion. The mixture was adjusted with acid, preferably nitric acid and/or phosphoric acid, to a pH value of 4. A dry film thickness of 4 μm was measured using an eddy current measurement device and SEM.

COMPARATIVE EXAMPLE 1

Substrate 1 was coated with the above dispersion. A dry film thickness of 300 nm to 500 nm was determined with SEM.

COMPARATIVE EXAMPLE 2

Substrate 2 was coated with the above dispersion. A dry film thickness of 300 nm to 500 nm was determined with SEM.

The micrographs consistently show formation of a homogeneous layer, which indicates a reliable, self-regulating and readily controllable coating.

The invention claimed is:

1. A method for coating a metallic surface comprising the steps of:
preparing a substrate with a cleaned metallic surface,
contacting and coating the cleaned metallic surface with an aqueous composition which forms an organic coating on the cleaned metallic surface that is based on an ionogenic gel which binds cations dissolved out of the metallic surface, wherein the cations originate from a pretreatment step or from the contacting step,
optionally rinsing the organic coating; and
drying or baking the organic coating or optionally drying the organic coating and coating the organic coating with a second coating composition before drying or baking,
wherein the aqueous composition comprises an anionic polyelectrolyte in an amount of 0.01 to 5.0 wt %, based on the total mass of the aqueous composition, in a dispersion of film forming polymers, wherein the aqueous composition has a pH value in the range of 4 to 11 and a solids content of 2 to 40 wt %, wherein the solids have an average particle size of 10 to 1000 nm; and
wherein the anionic polyelectrolyte is added to the dispersion of film-forming polymers to form the organic coating based on the ionogenic gel.

2. The method according to claim 1, wherein the anionic polyelectrolyte contains or consists of a) at least one polysaccharide based on glycogens, amyloses, amylopectins, calloses, agar, algines, alginates, pectins, carrageenan, celluloses, chitins, chitosans, curdlans, dextrans, fructanes, collagens, gellan gum, gum arabic, starches, xanthans, gum tragacanth, carayans, carabean powder and glucomannans; b) at least one anionic polyelectrolyte of natural origin based on polyamine acids, collagens, polypeptides, lignins or/and c) at least one synthetic anionic polyelectrolyte based on polyamino acids, polyacrylic acids, polyacrylic acid copolymers, acrylamide copolymers, lignins, polyvinyl sulfonic acid, polycarboxylic acids, polyphosphoric acids or polystyrenes.

3. The method according to claim 1, wherein the anionic polyelectrolyte contains or consists of at least one polysaccharide based on pectins or gellan gum.

4. The method according to claim 1, wherein the aqueous composition or the organic coating prepared therefrom contains a mixture of at least two different anionic polyelectrolytes.

5. The method according to claim 4, wherein the aqueous composition or the organic coating prepared therefrom contains a mixture of two pectins.

6. The method according to claim 1, wherein the aqueous composition or the organic coating prepared therefrom comprises at least one anionic polysaccharide selected from those having a degree of esterification of the carboxyl function in the range of 5% to 75%, based on the total number of alcohol and carboxyl groups.

7. The method according to claim 1, wherein the aqueous composition or the organic coating prepared therefrom comprises at least one anionic polysaccharide or at least one anionic polyelectrolyte selected from those having a molecular weight in the range of 500 to 1,000,000 g/mol$^{-1}$.

8. The method according to claim 1, wherein the aqueous composition or the organic coating prepared therefrom comprises at least one anionic polysaccharide or at least one anionic polyelectrolyte selected from those having a degree of amidation of the carboxyl functions in the range of 1 to 50%, a degree of epoxidation of the carboxyl functions of up to 80%.

9. The method according to claim 1, wherein the anionic polyelectrolyte is modified with adhesion imparting adhesion groups selected from the group consisting of chemical groups of multifunctional epoxies, isocyanates, primary amines, secondary amines, tertiary amines, quaternary amines, amides, imides, imidazoles, formamides, Michael reaction products, carbodiimides, carbenes, cyclic carbenes, cyclocarbonates, multifunctional carboxylic acids, amino acids, nucleic acids, methacrylamides, polyacrylic acids, polyacrylic acid derivatives, polyvinyl alcohols, polyphenols, polyols with at least one alkyl or aryl group, caprolactam, phosphoric acids, phosphoric acid esters, epoxy esters, sulfonic acids, sulfonic acid esters, vinyl sulfonic acids, vinyl phosphonic acids, catechol, silanes and any silanols or siloxanes formed therefrom, triazines, thiazoles, thiazines, dithiazines, acetals, hemiacetals, quinones, saturated fatty acids, unsaturated fatty acids, alkyds, esters, polyesters, ethers, glycols, cyclic ethers, crown ethers, anhydrides, acetyl acetones, β-diketo groups, carbonyl groups, and hydroxyl groups.

10. The method according to claim 1, wherein the aqueous composition or the organic coating prepared therefrom comprises at least one complexing agent for metal cations or a polymer modified by complexing with metal cations.

11. The method according to claim 10, wherein the aqueous composition or the organic coating prepared therefrom comprises at least one complexing agent based on a member selected from the group consisting of maleic acid, alendronic acid, itaconic acid, citriconic acid, mesaconic acid, and anhydrides or hemiesters of any of one of the aforementioned acids.

12. The method according to claim 1, wherein the aqueous composition or the organic coating prepared therefrom comprises at least one type of cations selected from those based on a salt having a cationic effect selected from the group consisting of a melamine salt, a nitroso salt, an oxonium salt, an ammonium salt, a salt with a quaternary nitrogen cation, a salt of an ammonium derivative and a metal salt wherein the metal salt comprises a metal selected from the group consisting of Al, B, Ba, Ca, Cr, Co, Cu, Fe, Hf, In, K, Li, Mg, Mn, Mo, Na, Nb, Ni, Pb, Sn, Ta, Ti, V, W, Zn and Zr.

13. The method according to claim 12, wherein the cations that are or have been dissolved out of the metallic surface or have been added to the aqueous composition are selected from the group consisting of Al, Cu, Fe and Zn.

14. The method according to claim 1, wherein the dispersion of film-forming polymers comprises an amount of organic particles which are contained in the aqueous composition or the organic coating prepared therefrom, the amount of organic particles based on polyacrylates, polyurethanes, polyepoxides or the hybrids thereof.

15. The method according to claim 1, wherein the aqueous composition or the organic coating prepared therefrom comprises at least one emulsifier.

16. The method according to claim 15, wherein the aqueous composition or the organic coating produced therefrom comprises at least one emulsifier selected from those based on an anionic emulsifier.

17. The method according to claim 1, wherein the aqueous composition or the organic coating prepared therefrom comprises at least one additive selected from the group consisting of a biocide, a dispersant aid, a film-forming aid, an acidic aid for adjusting the pH value, a basic aid for adjusting the pH value, a thickener and a flow control agent.

18. The method according to claim 1, wherein before contacting and coating the metallic surface with an aqueous composition, the metallic surface is cleaned, pickled or preprocessed.

19. The method according to claim 1, wherein the organic coating has a dry film thickness of at least 1 μm.

20. The method according to claim 1, wherein the organic coating is formed in 0.05 to 20minutes in an immersion bath and after drying has a dry film thickness in the range of 5 to 100 μm.

21. A method for coating a metallic surface comprising the steps of:
   preparing a substrate with a cleaned metallic surface;
   contacting and coating the cleaned metallic surface with an aqueous composition which forms an organic coating on the cleaned metallic surface which is based on an ionogenic gel which binds cations dissolved out of the metallic surface, wherein the cations originate from a pretreatment step or from the contacting step, wherein the aqueous composition is a suspension; and
   drying or baking the organic coating;
   wherein the suspension comprises an anionic polyelectrolyte in an amount of 0.01 to 5.0 wt % based on the total mass of the suspension and film-forming inorganic particles;
   wherein the suspension has a solids content of from 2 to 40 wt % and wherein the film-forming inorganic particles have an average particle size of from 10 to 1000 nm; and
   wherein the aqueous composition has a pH value in the range of 4 to 11.

22. A method for coating a metallic surface comprising the steps of:
   preparing a substrate with a cleaned metallic surface;
   contacting and coating the cleaned metallic surface with an aqueous composition comprising organic solids, wherein the aqueous composition is a dispersion of film-forming polymers, wherein the aqueous composition forms an organic coating on the cleaned metallic surface that is based on an ionogenic gel which binds cations dissolved out of the metallic surface, wherein the cations originate from a pretreatment step or from the contacting step; and
   drying or baking the organic coating;
   wherein the dispersion comprises an anionic polyelectrolyte in an amount of 0.01 to 5.0 wt % based on the total mass of the dispersion;
   wherein the aqueous composition has a solids content of 2 to 40 wt % and the solids therein have an average particle size of 10 to 1000 nm, and
   wherein the aqueous composition has a pH value in the range of 4 to 11.

* * * * *